United States Patent
Washio (10) Patent No.: US 7,911,656 B2
(45) Date of Patent: Mar. 22, 2011

(54) IMAGE PROCESSING APPARATUS, IMAGE PROCESSING METHOD, AND COMPUTER READABLE RECORDING MEDIUM STORING PROGRAM

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1249 days.

(21) Appl. No.: 11/454,864

(22) Filed: Jun. 19, 2006

(65) Prior Publication Data
US 2007/0211913 A1 Sep. 13, 2007

(30) Foreign Application Priority Data

Mar. 13, 2006 (JP) ................................. 2006-067209

(51) Int. Cl.
*H04N 1/04* (2006.01)

(52) U.S. Cl. ........ 358/474; 358/448; 358/497; 358/3.14; 358/1.9; 382/165; 382/100; 382/275; 347/233; 345/467

(58) Field of Classification Search .................. 358/474, 358/497, 496, 1.9, 448, 3.15, 3.06, 3.14, 358/504, 505, 2.1, 3.24, 3.13, 3.1, 1.2; 382/165, 382/100, 273, 274, 275, 173, 176; 347/233; 345/467

See application file for complete search history.

(56) References Cited

U.S. PATENT DOCUMENTS

| 5,602,940 | A * | 2/1997 | Inoue et al. .................... 382/180 |
| 6,169,562 | B1 * | 1/2001 | Morimoto ...................... 347/232 |
| 6,340,994 | B1 * | 1/2002 | Margulis et al. .............. 348/625 |
| 7,248,796 | B2 * | 7/2007 | Triteyaprasert et al. ...... 396/147 |
| 7,304,645 | B2 * | 12/2007 | Blask et al. .................... 345/424 |
| 7,336,392 | B2 * | 2/2008 | Kakutani ........................ 358/1.9 |
| 7,440,137 | B2 * | 10/2008 | Abe et al. ....................... 358/2.1 |
| 7,502,512 | B2 * | 3/2009 | Toura ............................. 382/209 |
| 7,568,921 | B2 * | 8/2009 | Pavlovic et al. ............. 439/76.2 |
| 7,570,391 | B2 * | 8/2009 | Hayaishi ........................ 358/1.9 |
| 7,602,442 | B2 * | 10/2009 | Kondo et al. ................. 348/473 |
| 7,706,048 | B2 * | 4/2010 | Horikawa et al. ............. 359/290 |
| 2001/0017709 | A1 * | 8/2001 | Murakami et al. ............ 358/1.14 |
| 2002/0063873 | A1 * | 5/2002 | Kakutani et al. ............... 358/1.8 |
| 2004/0174567 | A1 * | 9/2004 | Abe et al. ....................... 358/2.1 |

(Continued)

FOREIGN PATENT DOCUMENTS

| JP | 11-268229 | 10/1999 |
| JP | 2003-283827 | 10/2003 |
| JP | 2005-028645 | 2/2005 |

OTHER PUBLICATIONS

Japanese Office Action dated May 13, 2008.

*Primary Examiner* — Negussie Worku
(74) *Attorney, Agent, or Firm* — Finnegan, Henderson, Farabow, Garrett & Dunner, L.L.P.

(57) ABSTRACT

Disclosed is an image processing apparatus, comprising: an screen processing unit which shifts a position of a screen cell applied to an input image in at least one direction of a main scanning direction and a sub scanning direction of the input image by a first shift amount which changes according to the applied position of the screen cell, when screen processing is performed to the input image by using the screen cell.

16 Claims, 10 Drawing Sheets

U.S. PATENT DOCUMENTS

| | | |
|---|---|---|
| 2005/0008246 A1* | 1/2005 | Kinjo .................. 382/254 |
| 2005/0141036 A1* | 6/2005 | Kakutani .............. 358/3.05 |
| 2005/0259278 A1* | 11/2005 | Toura .................. 358/1.9 |
| 2005/0286066 A1* | 12/2005 | Hirano ................ 358/1.13 |
| 2006/0002604 A1* | 1/2006 | Sakai et al. .......... 382/141 |
| 2006/0092264 A1* | 5/2006 | Matsuzaki et al. ..... 347/233 |
| 2006/0139353 A1* | 6/2006 | Washio ................ 345/467 |
| 2006/0221395 A1* | 10/2006 | Komatsu .............. 358/3.01 |
| 2007/0061022 A1* | 3/2007 | Hoffberg-Borghesani et al. ............. 700/83 |
| 2007/0115440 A1* | 5/2007 | Wiklof ................ 353/69 |
| 2010/0277770 A1* | 11/2010 | Yao .................... 358/3.06 |

* cited by examiner

NO SHIFTS

FIG.5B

SHIFTED

FIG.6

CASE OF FORMING SCREEN ANGLE θ

|   | 0 | 1 | 2 | 3 |
|---|---|---|---|---|
| 4 | 5 | 6 | 7 |   |

FIG.12B

| 0 | 1 | 2 |   |
|   | 3 | 4 | 5 |
| 6 | 7 | 8 |   |

IMAGE PROCESSING APPARATUS, IMAGE PROCESSING METHOD, AND COMPUTER READABLE RECORDING MEDIUM STORING PROGRAM

CROSS-REFERENCE TO RELATED APPLICATION

The present U.S. patent application claims a priority under the Paris Convention of Japanese patent application No. 2006-67209 filed on Mar. 13, 2006, and shall be a basis of correction of an incorrect translation.

BACKGROUND

1. Field of the Invention

The present invention relates to an image processing apparatus, an image processing method and a computer readable recording medium storing a program, each performing screen processing.

2. Description of Related Art

Forgery of a negotiable instrument, a passport and the like has been frequently committed as the improvement of the digital image processing and printing techniques in a color copier, a printer and the like in recent years. Accordingly, development of the techniques for preventing forgery has been performed vigorously, and the developed techniques are used.

For example, there has been disclosed a technique capable of genuineness determination of original or duplicate based on intervals of each dot constituting dotted lines which are drawn in an image together with curved lines, in which the original image is drawn to have a structure of arranging the curved lines and the dotted lines arranged interleavingly (see, for example, JP 2005-28645A). Moreover, there has been also disclosed a technique capable of the genuineness determination based on the shape of halftone dots of a printed image by using a particular screen cell. In this technique, the shape of a screen cell in dither method has an elaborate design when half tone is reproduced, (see, for example, JP 11-268229A).

Moreover, as one of the techniques for preventing forgery, a sketch-like painting technique using curved lines (hereinafter referred to as a pictorial technique) can be cited. The technique is a printing technique represented by a copperplate print technique used in, for example, a portrait printed on a banknote, or the like. In this technique, grooves are directly formed on a copperplate with a graver or the like to create a plate, and an ink is filled in the grooves on the plate to be transferred on printing paper. Thus a printed matter can be obtained.

Light and shade on a printed matter is adjusted based on widths and the depths of the grooves, and the grooves are formed by hand. Consequently, an image formed on the printed matter is naturally expressed by curved lines.

Drawing a geometric pattern, a person and the like by such an expression using curved lines enables to acquire a forgery prevention effect. The reason is as follows.

As a first reason, it can be cited that it is difficult to express a curved line is by the present half tone reproduction technique in an image processing apparatus.

In an image processing apparatus, a dither method, error diffusion method and the like are used as the half tone reproduction technique. The former method is to express light and shade (half tone) by using a dot pattern repeated in a comparatively short uniform period and by controlling the sizes of the dots. The latter method is to express light and shade by controlling density of the dots (the number of dots) per a unit area, although the sizes of the dots themselves are uniform. In these methods, it is impossible to express light and shade at least by using gentle curved lines like in a copperplate print. As for the dither method, the reason of the impossibility is that the pattern period is limited to about several pixels owing to the cost thereof and it is difficult to obtain the pattern period sufficient for drawing curved lines. As for the error diffusion method, the reason of the impossibility is that light and shade is basically expressed only by density of dispersed dot having no periodicity.

That is, a new technique is required to realize the half tone reproduction using gentle curved lines, and such a technique has not been established. Moreover, even if such a technique is established, because a copperplate print used for a specific negotiable instrument is hand-carved, its lines are complicated and it is difficult to reproduce quite the same streaks even if a specific function is used.

As a second reason, a problem of reading resolution of a scanner can be cited. For committing forgery, an image of a negotiable instrument or the like is read with a scanner, and the read image is printed. When a pattern or the like drawn with curved lines is read with a scanner, moiré sometimes occurs. The reason of the moiré is that a curved line pattern includes various spacial frequencies. Because image quality is deteriorated when moiré occurs, whether the image is an original or not can be easily discriminated.

As a third reason, the deterioration of image quality caused by erroneous discrimination of image species in an image processing apparatus can be cited. A general image processing apparatus discriminates an image species such as a character, photographic image or the like so as to perform different image processing to each image species. However, the accuracy thereof is not perfect, and erroneous discrimination is sometimes preformed. As a discrimination method, there is a method of cutting out a local region to discriminate whether the cut local region is a character or an image other than the character by pattern matching. Because the local region to be referred to is only a region corresponding to several pixels, erroneous discrimination can be performed. Because the deterioration of image quality occurs in the part where such erroneous discrimination is performed, the discrimination of whether the image is the original or not can be made based on the deteriorated part of image quality.

Moreover, one of the methods of discriminating an image portion other than characters is to detect the halftone dot structure of a printed matter. Specifically, the method is the method of detecting the periodicity of light and shade (or screen ruling) by pattern matching. However, the range in which the periodicity can be detected is limited. If the screen ruling is within this range, it is possible to discriminate the halftone dot image portion of a printed matter. Accordingly, it is possible to keep accuracy of the discrimination by adjusting the detectable period by the adjustment of a parameter or the like according to each printed matter. This is because it is rare to use the halftone dot structures having the mutually different screen ruling on one same page due to a cost problem, although the screen ruling used in a printed matter is various according to the uses thereof.

However, if such a discrimination technique is applied to an image having a halftone dot structure in which the period of halftone dots gently varies over a wide range, then erroneous discrimination is caused due to the gentle variation. Because the erroneously discriminated portion of a gentle variation is very conspicuous, it is possible to easily judge whether a printed matter is a copy or not by visual observation based on the portion.

As described above, the painting of an image by the pictorial technique with curved lines has a forgery prevention effect.

However, as described above, there are no techniques of reproducing a gentle curved line pattern into half tones by image processing. Although the technique described in the JP 2005-28645A can draw a curved line, but the technique is not for reproducing half tones by the image processing of the dither method or the like.

Moreover, a matter having a high added value such as a negotiable instrument is worth providing a high-grade forgery preventing measure such as a hologram, IC chip or the like and spending a large cost. However, as for a printed matter such as a mere voucher, which has a low added value and is wanted to be printed with a general copier or a printer simply, and is also wanted to be prevented from forgery. Thus, forgery prevention at low cost is required.

SUMMARY

It is one of objects of the present invention to realize image processing at a low cost, the image processing capable of creating a printed matter which is difficult to forge.

According to one aspect of the invention, an image processing apparatus comprises: an screen processing unit which shifts a position of a screen cell applied to an input image in at least one direction of a main scanning direction and a sub scanning direction of the input image by a first shift amount which changes according to the applied position of the screen cell, when screen processing is performed to the input image by using the screen cell.

According to another aspect of the invention, an image processing apparatus comprises: a screen processing unit which applies screen cells to an input image repeatedly in two dimension, so as to perform screen processing to the input image, wherein the screen processing unit shifts the screen cells to be a state that a relative positions of the screen cells among the screen cells change periodically in a predetermined direction of the input image.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENTS

In the following, an embodiment to which the present invention is applied is described with reference to the attached drawings.

In the present embodiment, the following example is described. In screen processing using a screen cell, the position of the screen cell is periodically shifted when the screen cell is applied to an input image, and consequently the screen shape acquired by the screen processing is made to be in a wave line.

Hereupon, the screen shape means the shape of a repetition pattern composed of a screen cell as a constitutional unit.

First, a constitution is described.

Figure 1:
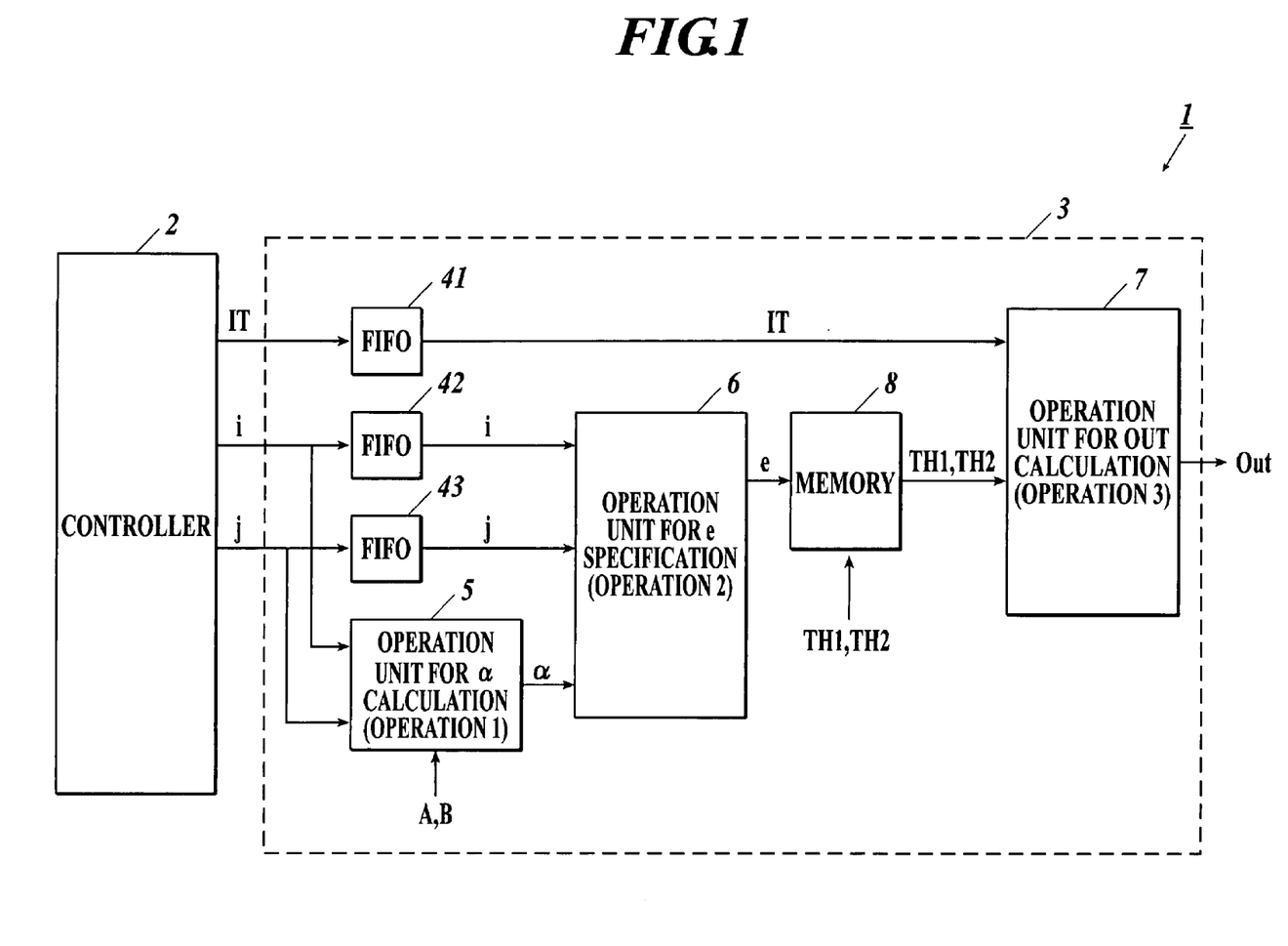
FIG. 1 is a diagram showing the constitution of an image processing apparatus according to a present embodiment.

FIG. 1 shows the constitution of an image processing apparatus 1 in the present embodiment.

As shown in FIG. 1, the image processing apparatus 1 comprises a controller 2 and a screen processing unit 3. The image processing apparatus 1 performs screen processing to an input image with the screen processing unit 3, and outputs the processed image to a printer apparatus.

The controller 2 receives the data of the input image from outside, and generates the image signal IT of each pixel by rasterize processing. In the case of performing color printing, the controller 2 performs color conversion to each color material used at the time of outputting an input image for printing.

The screen processing unit 3 is one performing multi-valued screen processing to the input image from the controller 2 to reproduces a halftone. As shown in FIG. 1, the screen processing unit 3 is composed of first-in-first-outs (FIFOs) 41-43, operation units 5-7, a memory 8 and the like.

The FIFOs 41-43 are delay memories for adjusting the input timing of signals IT, i and j to the operation units 7 and 6, respectively.

The operation units 5-7 are operation circuits performing various operations at the time of screen processing.

The operation unit 5 performs the operation of a shift amount a of a screen cell. This operation is referred to as an operation 1.

The operation unit 6 performs the operation of specifying the cell element e of the screen cell corresponding to a pixel to each of the image signals IT of the input image. This operation is referred to as an operation 2.

The operation unit 7 performs the operation of an output value "Out" which is the image signal IT subjected to the screen processing, by using threshold values TH1[$e$] and TH2[$e$] corresponding to the cell element e specified by the operation unit 6. This operation is referred to as an operation 3.

The details of each of the operations 1-3 will be described later.

The memory 8 stores look-up tables tb1[$e$] and tb2[$e$] necessary for the operation 3. These look-up tables tb1[$e$] and tb2[$e$] define the threshold values TH1[$e$] and TH2[$e$] each corresponding to the cell element e of the screen cell. When a signal e of the cell element e is input from the operation unit 6, the memory 8 outputs the threshold values TH1[$e$] and TH2[$e$] corresponding to the input signal e to the operation unit 7.

Next, the screen processing executed in the image processing apparatus 1 is described with reference to FIG. 2.

Figure 3:
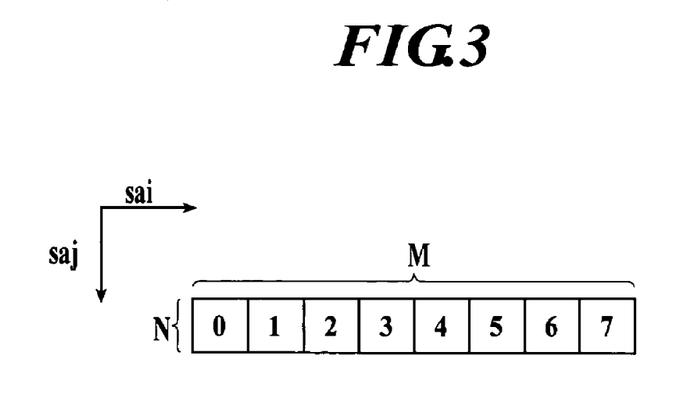
FIG. 3 is a view showing an example of a screen cell.

In the screen processing, the linear screen cell as shown in FIG. 3 is used. The screen cell is composed of a plurality of cell elements (one cell element corresponds to one pixel), and two independent threshold values TH1 and TH2 (TH1<TH2) correspond to each of the cell elements.

Because the screen cell shown in FIG. 3 is composed of eight cell elements e(e=0, 1, 2, 3, 4, 5, 6, 7), eight couples of the two threshold values TH1[$e$] and TH2[$e$] exist.

In the screen processing, an relation between an input and an output is defined based on a first degree formula relative to the two threshold values TH1[$e$] and TH2[$e$], which each of the cell elements e has, and the output value Out (processed image) to an input image signal IT (input value) is acquired.

Figure 5A:
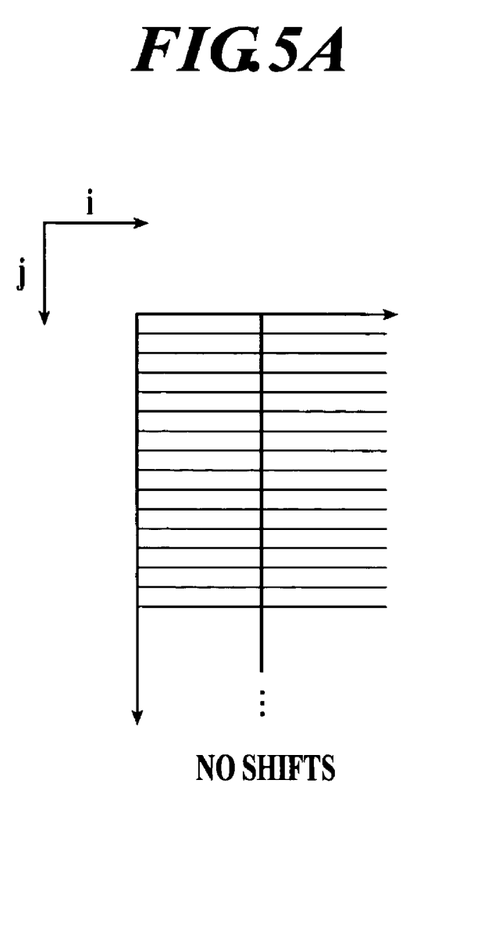
FIG. 5A is a view showing an application result of a screen cell to an input image in the case where no shifting of the screen cell is performed.

When it is supposed that the reading direction of an input image is the main scanning direction (hereinafter referred to as an i direction) and the direction perpendicular to the main scanning direction is the sub scanning direction (hereinafter referred to a j direction), a result shown in FIG. 5A is acquired when the screen cell of FIG. 3 is applied to the input image without performing any special processing. As shown in FIG. 5A, all the application positions of the screen cell in the i direction of the input image become the same, and the screen shape of one column of the screen cells as constitutional units (a group of the screen cells arranged in the j direction) becomes straight lines. If a screen angle is provided, the screen cell is applied while being shifted by a fixed quantity in a fixed direction of the i direction. However, also in this case, only an inclination is produced, and the screen shape itself becomes a straight linear one.

Figure 5B:
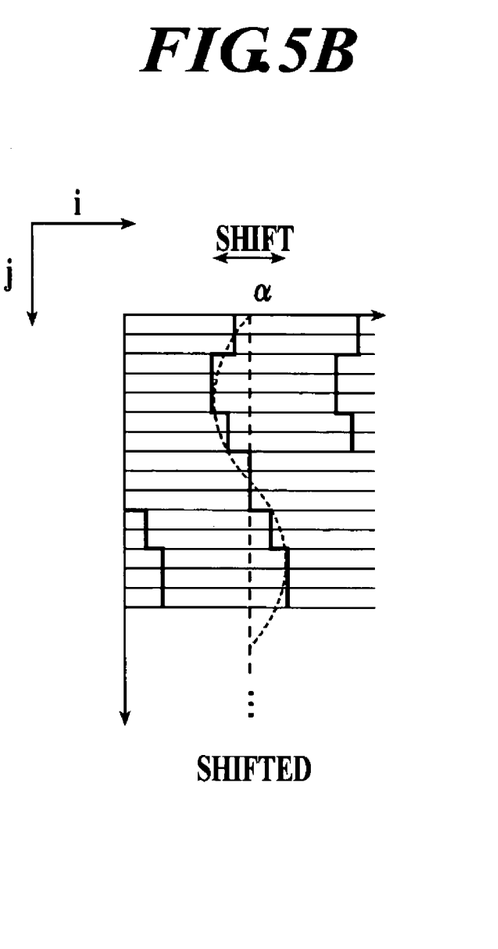
FIG. 5B is a view showing another application result of the screen cell to the input image in the case where the screen cell is periodically shifted.

In the present embodiment, described is an example forming a screen shape of a wave line as shown in FIG. 5B by periodically shifting the positions to which the screen cell is applied into the i direction of the input image.

Figure 2:
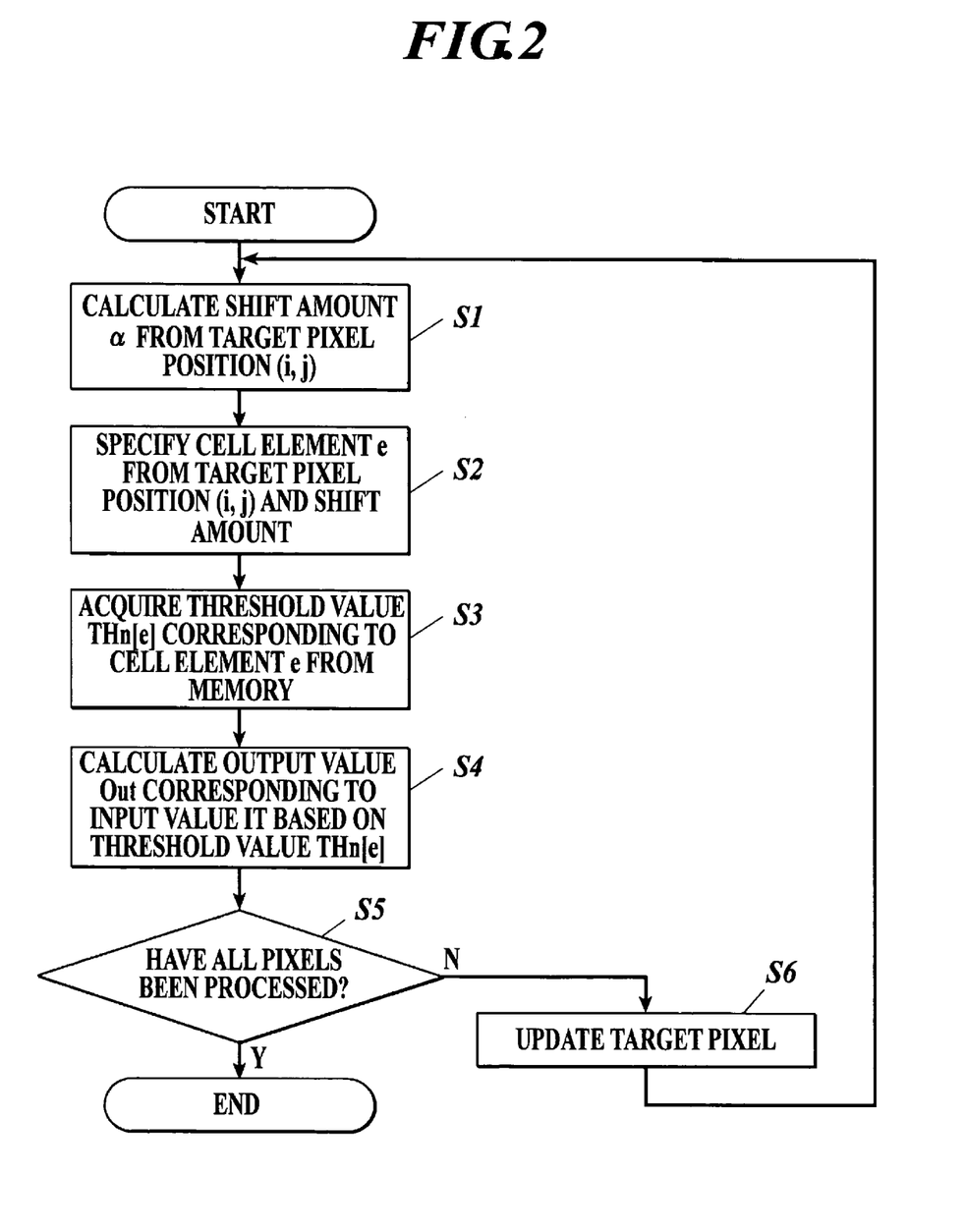
FIG. 2 is a flowchart showing the screen processing executed in the image processing apparatus of FIG. 1.

FIG. 2 is a flowchart showing the screen processing in the present embodiment.

In the screen processing shown in FIG. 2, the input image signal IT of each pixel is output from the controller 2 to the screen processing unit 3. A pixel to be output in this order and to be a processing object is referred to as a target pixel. Moreover, the controller 2 outputs signals i and j, both indicating the position of the target pixel in the whole input image, together with the image signal (pixel value) of the target pixel. The signals i and j are the position coordinate values of the input image in the i direction and the j direction.

In the screen processing unit 3, the image signal IT (pixel value) of the target pixel is input into the operation unit 7 through the FIFO 41. Moreover, the signals i and j are input into the operation unit 5, and they are also input into the operation unit 6 through the FIFOs 42-43.

First, in the operation unit 5, the shift amount a of a screen cell is calculated from the position (i, j) of the target pixel (Step S1; operation 1). The shift amount α is expressed by a function of the coordinate (i, j) as shown in the following expression (1).

$$\alpha = f(i, j) \quad (1)$$

What is necessary for the function f is just to be a periodic function. When a sine function is applied, for example, the function f is expressed by an expression such as the following expression (2).

$$\alpha = C \times i + A \times (1 + \sin(j \times B \times 2\pi/180)) \quad (2)$$

where, characters A, B and C denotes parameters controlling the function, and in particular the parameter A controls the amplitude of a sin curve, and the parameter B controls the period of the sine curve. It is possible to form a gentle wave and a rugged wave of the wave line shape of the screen by changing the amplitude and the period with the parameters A and B.

Moreover, it is possible to form a screen angle with the parameter C.

Figure 6:
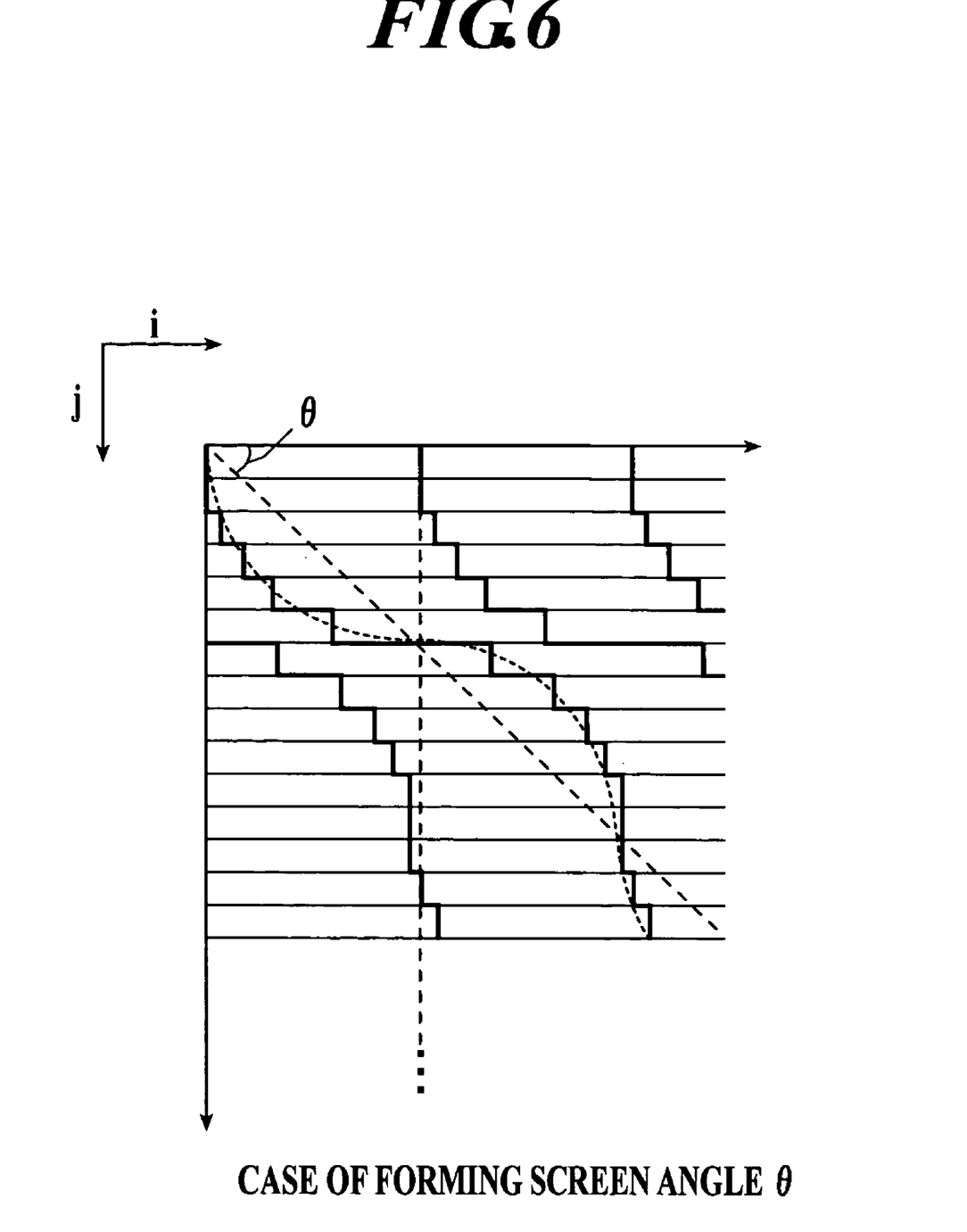
FIG. 6 is a view showing a shift result of a screen cell in the case of forming a screen angle.

When the screen angle is formed, it is necessary to shift the screen cell by a quantity according to the screen angle (the shift amount expressed by the term of C×i in the expression (2)) in addition to the shifting for varying the screen cell periodically (the shift amount expressed by the term of A×(1+sin(j×B×2π/180) in the expression (2)). Accordingly, as the parameter C, what is necessary is just to set j/tan θ indicating the position i to the position j of the screen cell at the time of forming the screen angle. The j/tan θ is defined by a function j=tan θ×i of the screen angle θ. For example, when the screen angle is 45 degrees, the screen cell should be shifted by the quantity expressed by a straight line having an inclination of one as shown in FIG. 6. In this case, because the inclination is one, what is needed is to set the parameter C equal to the function j. In addition, when no screen angles are formed, the parameter C is set to be zero.

Because the shift amount α depends only the coordinate j when the screen cell is shifted only in the i direction and no screen angle is formed, the expression (2) can be expressed as the following expression (3).

$$\alpha = A \times (1 + \sin(j \times B \times 2\pi/180)) \quad (3)$$

Figure 7:
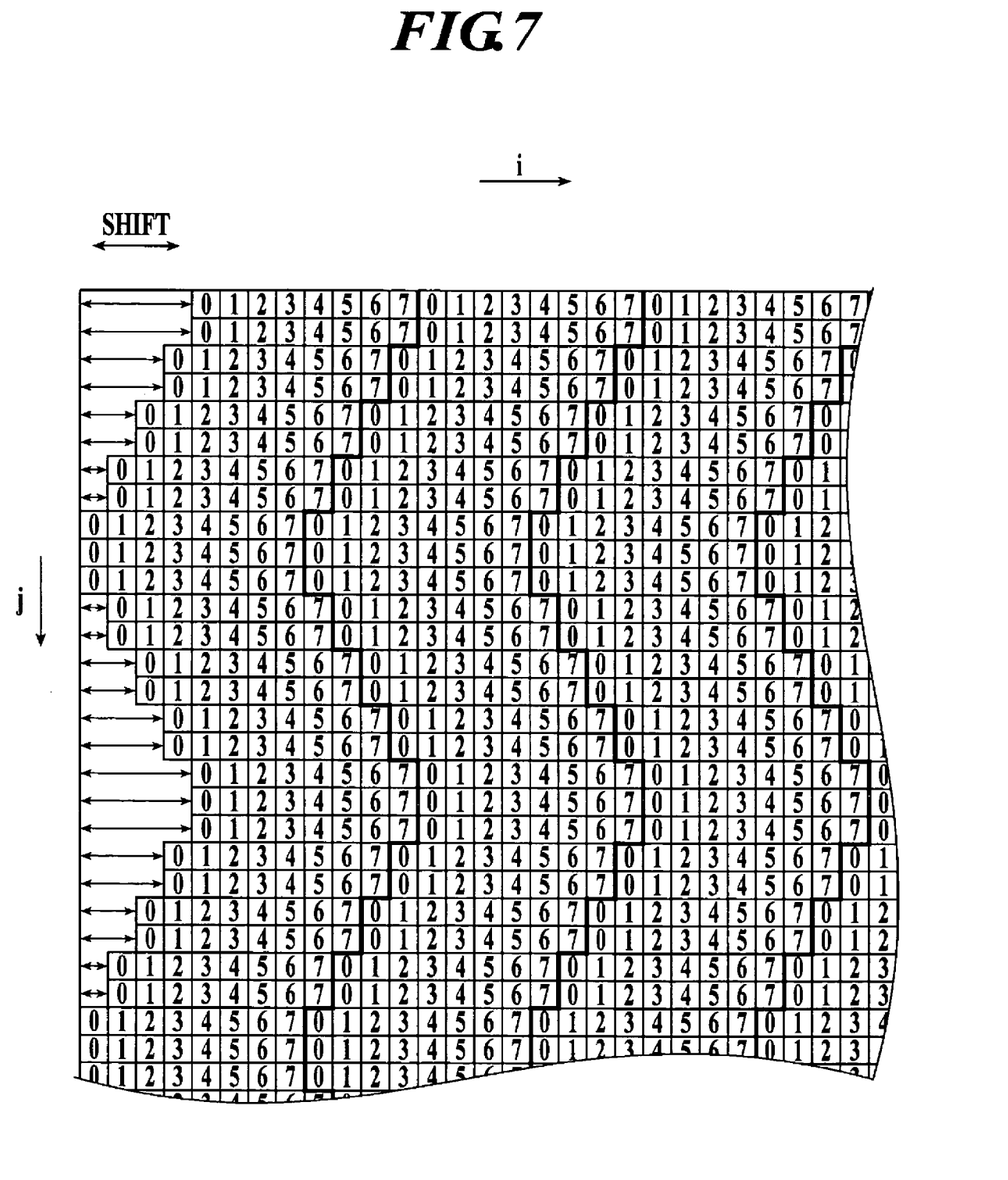
FIG. 7 is a view showing an example where a screen cell is applied to an input image with shifting the screen cell to the input image periodically.

As a result of shifting the application positions of the screen cell shown in FIG. 3 based on the shift amount α calculated by the expression (3), the application positions of the screen cell to the input image becomes the ones as shown in FIG. 7. Because the shift amount α is defined by a periodical function, the screen cell which should be originally applied to the same position in the i direction even if the application position in the j direction varies is applied at the positions which periodically vary according to the positions in the j direction, as shown in FIG. 7. Consequently, the screen pattern for one row is composed of the screen cell as the constitutional unit forms wavy lines.

The calculation result of the shift amount α is output to the operation unit 6. Moreover, the coordinates i and j of the target pixel are output from the FIFOs 42 and 43 to the operation unit 6 synchronously with the timing.

The operation unit 6 specifies the cell element e corresponding to the target pixel in the screen cell based on the input coordinates i and j of the target pixel and the shift amount α of the screen cell (Step 2; operation 2).

Specifically, characters sai and saj (see FIG. 3) indicating the position of the target pixel in the screen cell are acquired by the following expressions (4)-(6), and the cell element e according with the position (sai, saj) is acquired.

$$sai = [i + \alpha] \% M \quad (4)$$

$$saj = j \% N \quad (5)$$

$$e = sai + saj \times M \quad (6)$$

where the character M denotes the number of the cell elements in the sai direction, and the character N denotes the number of the cell elements in the saj direction.

In addition, because M=8 and N=1 in the case of the screen cell of FIG. 3, the above expressions (4)-(6) are briefly expressed by the following expression (7).

$$e = (i + \alpha) \% M \quad (7)$$

That is, the operation units 5 and 6 specify the cell element e corresponding to the target pixel in the state in which the screen cell is shifted by the shift amount α in the i direction. Moreover, the shift amount α is not fixed, and is controlled so as to periodically vary according to the positions of the target pixel in the j direction by the operation of the expression (3).

If the cell element e is specified, the signal e thereof is output to the memory 8, and the threshold value THn[e](n=1, 2) corresponding to the specified cell element e is acquired from the memory 8 (Step S3). The threshold value THn[e] can be taken out by inputting the cell element e into the LUTs tb1[M×N] and tb2[M×N] provided in the memory 8 (see the following expressions (8) and (9)).

$$TH1[e]=tb1[e] \quad (8)$$

$$TH2[e]=tb2[e] \quad (9)$$

The LUTs tb1[M×N] and tb2[M×N] hold the threshold values TH1[e] and TH2[e] of all the cell elements e. Because the screen cell of FIG. 3 has eight cell elements, the LUTs tb1[M×N] and tb2[M×N] severally become the row of 16 figures. If the LUTs tb1[M×N] and tb2[M×N] are expressed by the codes of the C language, they can be expressed as follows.

int tb1[8]=[0, 32, 64, 96, 128, 160, 192, 224]

int tb2[8]=[32, 64, 96, 128, 160, 192, 224, 255]

In addition, the LUTs tb1[M×N] and tb2[M×N] are created so that $TH1[e]<TH2[e]$.

The acquired threshold values TH1[e] and TH2[e] are output to the operation unit 7, and the image signal IT of the target pixel is also output from the FIFO 41 to the operation unit 7 synchronously with the timing.

The operation unit 7 calculates the output value Out to the input image signal IT by the following expression (10) (Step S4; operation 3).

$$\text{Out}=[(IT-TH1[e])\times 255/(TH2[e]-TH1[e])] \quad (10)$$

Provided that Out<0, then Out=0, and that Out>255, then Out=255.

Figure 4:
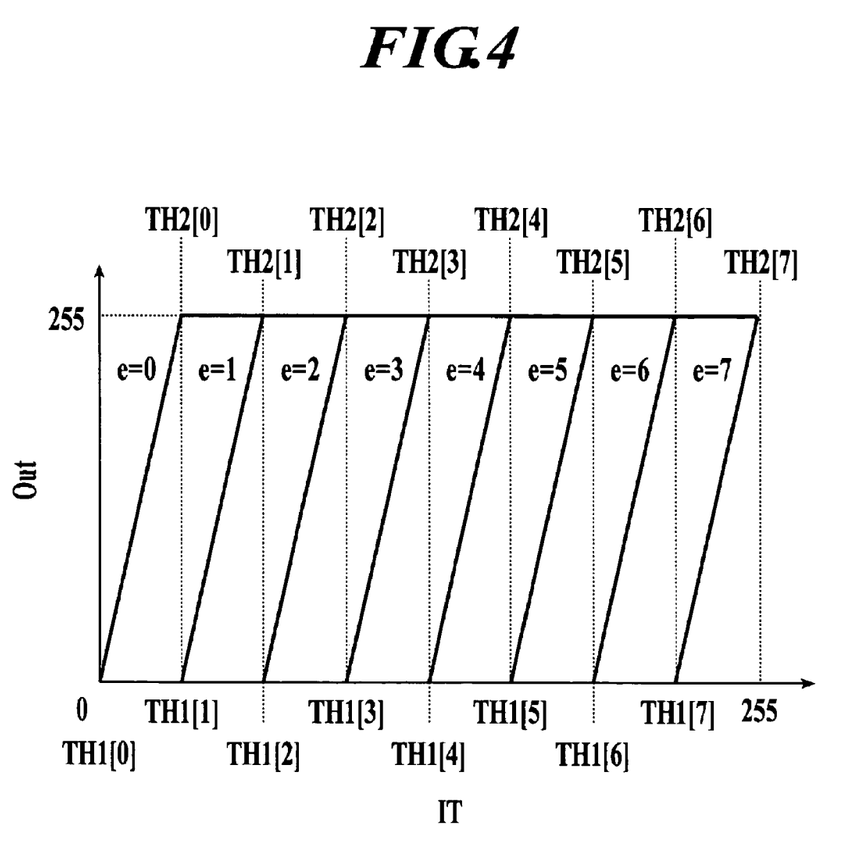
FIG. 4 is a diagram showing an input-output characteristic defined by threshold values in each cell element of the screen cell of FIG. 3.

The input-output characteristics expressed by the expression (10) are as ones shown in FIG. 4.

The processing at Steps S1-S4 is repeatedly performed, updating the target pixel (Step S5; N, Step S6). When the processing has been completed to all the pixels and the output values Out of all the pixels have been output (Step S5; Y), the present processing is ended.

Figure 8:
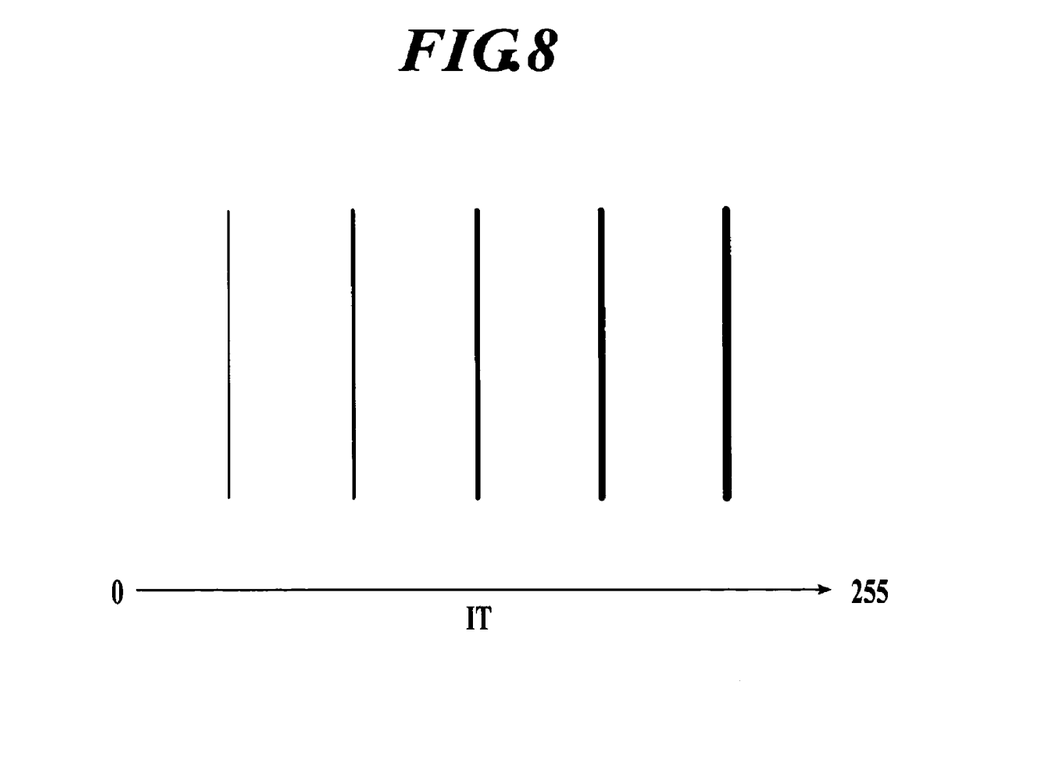
FIG. 8 is a view showing a screen processing result in the case where no shifting of a screen cell is performed.
Figure 9:
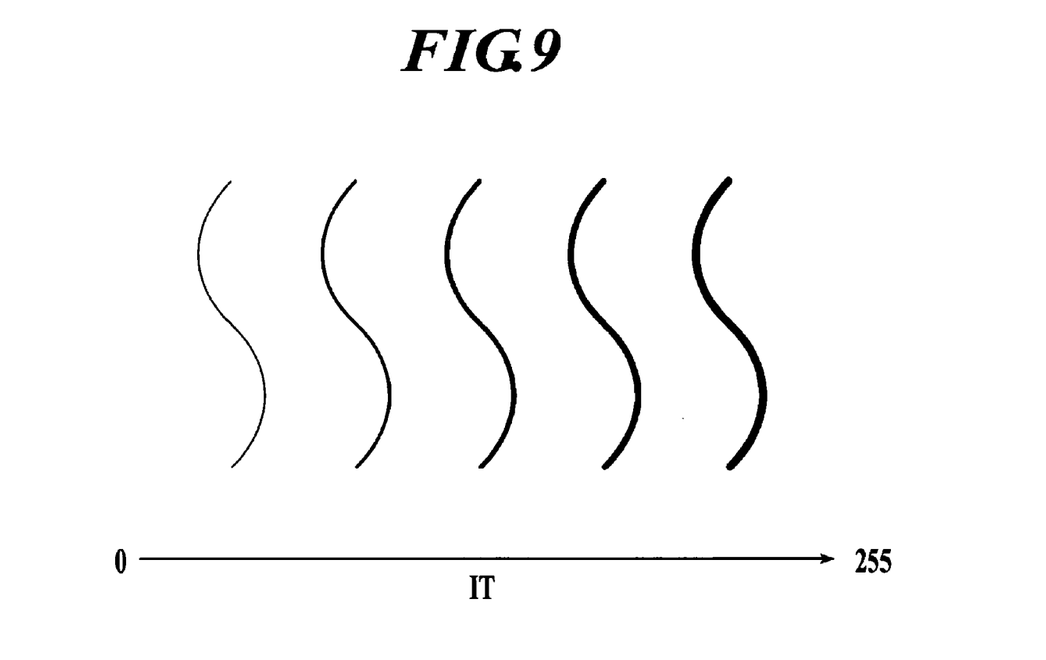
FIG. 9 is a view showing a screen processing result in the case of shifting a screen cell periodically.

As a result of performing such screen processing, when the shift amount is 0, namely in the case of the ordinary screen processing in which the screen cell is not shifted, the straight line-like screen shapes as shown in FIG. 8 are displayed. However, because the screen cell has been periodically shifted in this case, the screen shapes become wave line-like ones as shown in FIG. 9. In both the cases, the line widths of the screens vary according to the input image signal IT, and light and shade are expressed by the line widths.

Figure 11:
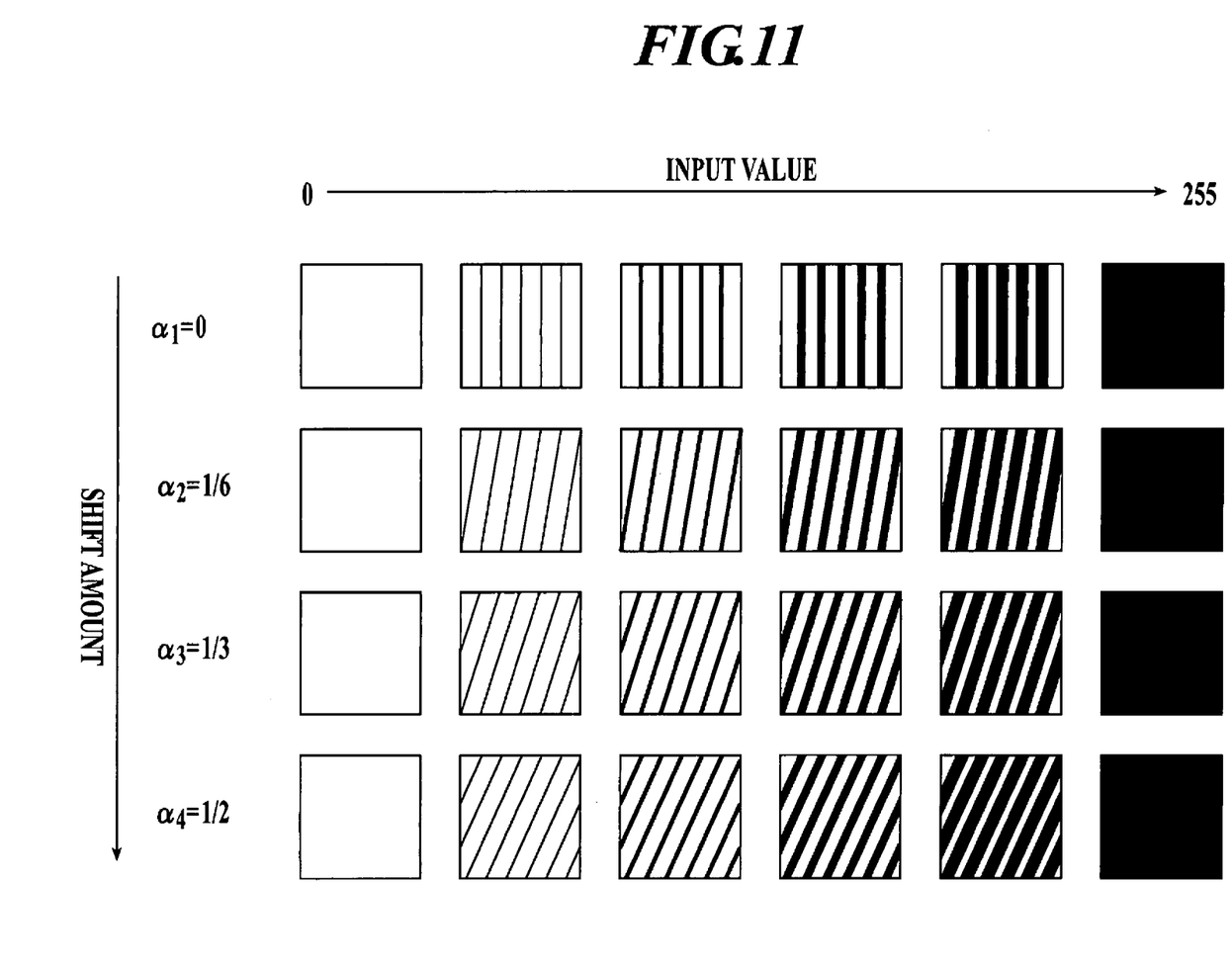
FIG. 11 is a view showing an example of a test pattern used to create a LUT used for tone correction.

In addition, because screen shape continuously varies owing to the shifts of the screen cell, density characteristic varies as the printing position (i, j) varies. For example, in a wave line-like screen shape as shown in FIG. 11, the line widths are the same in the straight line portions and the inclined portions in the case of being shifted, but their line densities are different from each other. Consequently, although the input image signal IT is the same, the output densities of the portions become thicker as the printing position moves from the straight line portions to the inclined portions. When the printing position contrarily moves from the inclined portions to the straight line portions, the output densities become thinner. When these movements are periodically repeated, a continuous variation of the density characteristic is shown as a result. Consequently, if the uniform tone correction like the prior art is performed at the preceding stage of the screen processing, a periodical density variation is caused. It is accordingly preferable to vary the contents of the tone correction according to the variation of the continuous variation of the density characteristic also in the tone correction.

In the following, the tone correction which is preferably applied in the case of shifting a screen cell is described.

Figure 10:
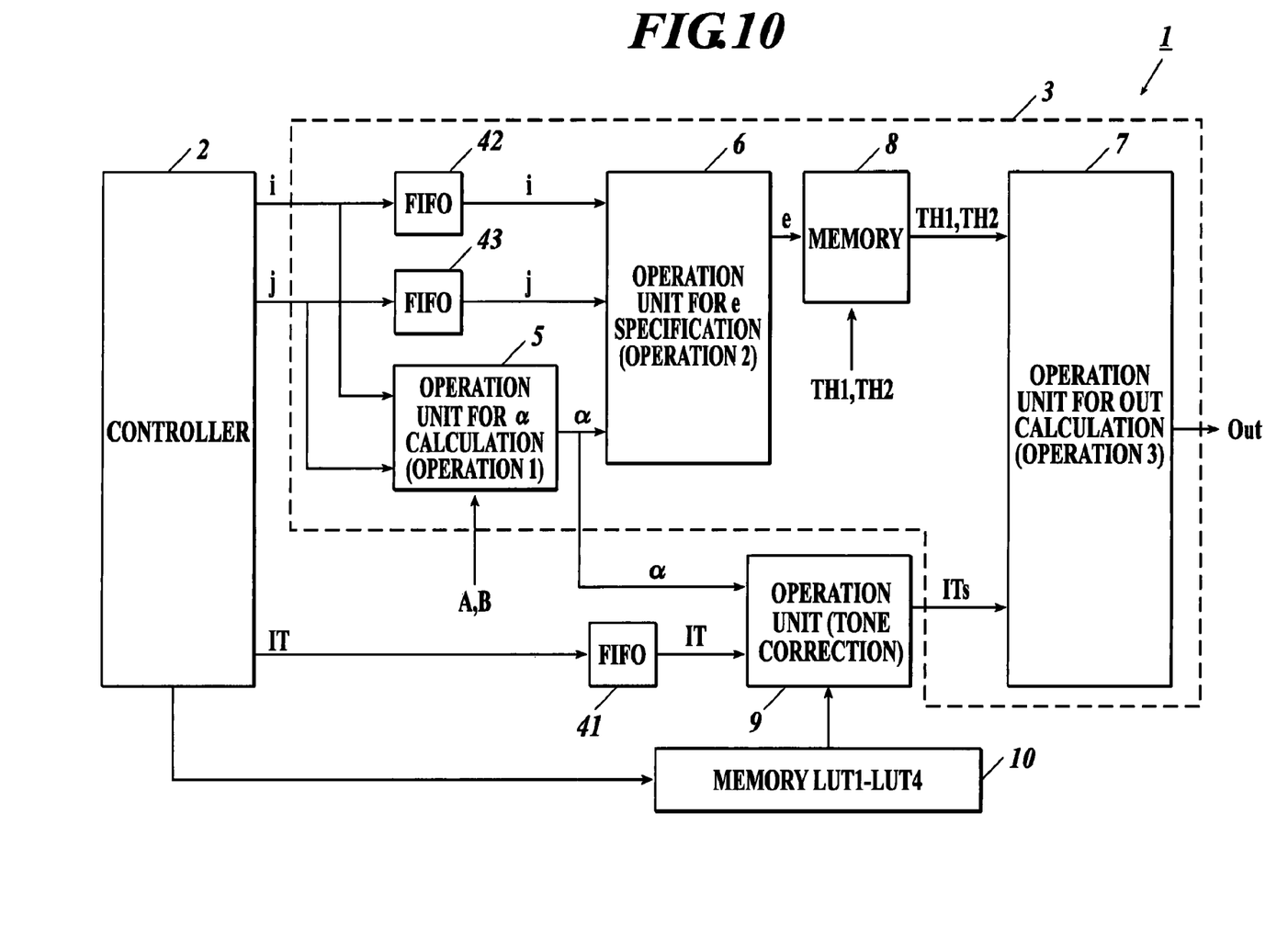
FIG. 10 is a diagram showing the constitution of an image processing apparatus in the case of performing tone correction according to the shift amount of a screen cell.

As for the constitution, as shown in FIG. 10, an operation unit 9 performing the operation for tone correction is added to the constitution shown in FIG. 1, and a memory 10 storing LUTs and the like used in the operation unit 9 is newly provided. Because screen processing is performed in the operation unit 7 after performing the tone correction in the operation unit 9, the FIFO 41 is provided at the preceding stage of the operation unit 9, and the image signal IT of an input image is input into the FIFO 41.

First, the input-output characteristics of the tone correction are defined, and in order to make the input-output characteristics as a LUT, the creation of a tone correction curve is performed by the control of the controller 2. A test pattern (a pattern image for a test) shown in FIG. 11 is used for the creation of the tone correction curve. The test pattern is composed of patch-like images acquired by varying the gradation (pixel values) stepwise from 0 to 255 to each of a plurality of shift quantities $\alpha_k$(k=1, 2, 3, 4), as shown in FIG. 11. In addition, actually, although the shift amount α is always continuously varying, the value of the shift amount α is fixed in each patch image in the test pattern. The fixation is performed in view of the measurement ability of aperture sizes or the like of density measuring means when the test pattern will be output to be printed later and the output density will be measured.

The operation units 5-7 perform the screen processing to the test pattern, and perform the printout of the processed test pattern. At this time, the operation unit 9 does not perform any tone correction, and outputs the input image signal IT to the operation unit 7 as it is. Then, a density measurement is performed to the printed matter, and the result is input into the controller 2. The controller 2 uses the pixel value of each patch image as an input value, and the density value measured to each patch image as an output value, and thereby acquires a density characteristic curve. The inverse characteristic based on the target gradation characteristic of the density characteristic curve is the tone correction curve. The tone correction curve is acquired to each shift amount $\alpha_k$, and each $LUT_k$ made to be a LUT is stored in the memory 10.

At the time of the tone correction, the tone correction according to the variation of the screen pattern shape by the shifting is performed using the $LUT_k$ in the operation unit 9. Because only $LUT_k$ corresponding to k pieces of αs is prepared to the shift amount α, which continuously varies, corrections by interpolation operations are performed for α values between $\alpha_k$. Specifically, two of $\alpha_{k-1}$ and $\alpha_k$, which meet the relation of $\alpha_{k-1}<\alpha<\alpha_k$, are acquired to the shift amount α calculated in the operation 1, and the $LUT_{k-1}$ and the $LUT_k$ corresponding to the $\alpha_{k-1}$ and $\alpha_k$, respectively, are selected. Then, an output value ITs after the tone correction to the input image signal IT is acquired by the following expression (11) using the two of the $LUT_{k-1}$ and the $LUT_k$.

$$ITs=[LUT_{k-1}[IT]\times(\alpha_k-\alpha)+LUT_k[IT]\times(\alpha-\alpha_{k-1})/(\alpha_k-\alpha_{k-1}) \quad (11)$$

In addition, although the expression (11) is an example of a simple first degree interpolation operation, the interpolation operation is not limited to the first degree interpolation operation. The interpolation may be performed by other methods such as a spline function and the like.

As described above, according to the present embodiment, the operation unit 5 calculates the shift amount a, and each pixel is made to correspond to the cell element e of a screen cell in the state in which the screen cell is shifted by the shift amount α. Thereby, the output value Out can be acquired with the threshold values TH1[e] and TH2[e] of the cell element e after the shifting.

As a result, the printout of an image becomes possible with the screens of wave line shapes as shown in FIG. 9. That is, because the application positions of a screen cell which has been repeatedly applied in two dimensions mutually establish a relation of being shifted by periodically varying the shift amount relative to a predetermined direction of the input image, the screens, each having the shape of a curved line, can be realized. By performing image formation with the screens, each having the shape of the curved line, it is possible to always vary the line density and the angles of the screen lines.

Because, in the printed matter by such a curved line expression, the line density of the number of screen lines and the angles of the screen lines continuously vary according to printing position, the printed matter includes various spatial frequencies, and it is easy to generate moiré in a copy by the reading using a scanner. Moreover, because a screen of curved lines has a halftone dot structure in which the period of halftone dots gently varies over a wide range, erroneous discrimination with a gentle variation becomes frequent when a printer apparatus performs the discrimination of image species, and it becomes possible to easily discriminate the copy from the original with visual observation. Accordingly, by outputting an image with screens in wave line shapes, it becomes possible to generate the deterioration of image quality in a duplicate of the image, and by the deterioration of image quality, the judgment of whether an image is a duplicate or not is enabled with visual observation. Consequently, the forgery prevention effect can be acquired.

Moreover, a wave line-like screen shape can be realized with a simple structure in which a shift amount a is calculated with the operation unit 5 and the cell element e corresponding to each pixel of an input image is operated according to the shift amount α. Thereby, it is possible to prevent forgery at a low cost.

Moreover, it is also possible to form a screen angle by adding a shift amount according to a screen angle to a shift amount for forming a wave line shape.

Accordingly, by making the screen angle of each color different from each other at the time of outputting a color image, the generation of moiré can be suppressed. Moreover, because the period and the amplitude of a wave line shape of a screen can be controlled at the time of the operation of a shift amount α, the generation of moiré can be suppressed by controlling the period and the amplitude of each color to make the wave line shape itself different from each other.

Moreover, because the tone correction according to a variation of a screen pattern shape by shifting is performed, the tone correction according to the density characteristic of continuously varying by shifting can be performed.

For the tone correction, a LUT is not prepared to all α values, but a $LUT_k$ is created only to an arbitrary $α_k$, and as for α values between $α_{k-1}$ and $α_k$ interpolation operation is performed using k $LUT_k$s. Consequently, there is no need of being provided with the LUTs corresponding to all the shift quantities α, and the constitution can be made to be simplified.

In addition, the embodiment described above is a suitable example to which the present invention is applied, and the present invention is not limited to the embodiment.

Figure 12A:
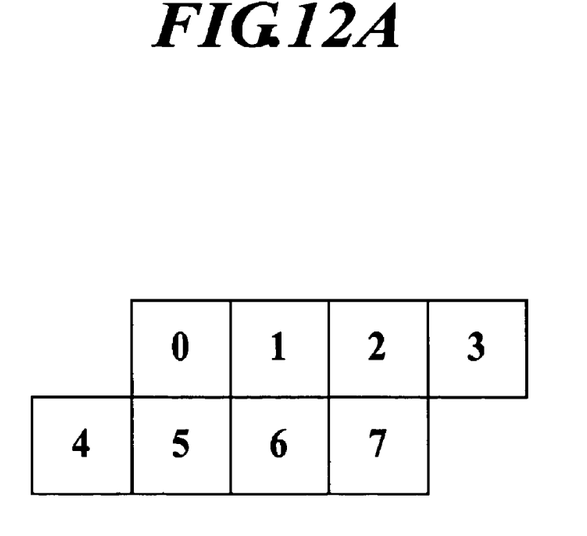
FIGS. 12A and 12B are views showing other examples of the screen cell.
Figure 12B:
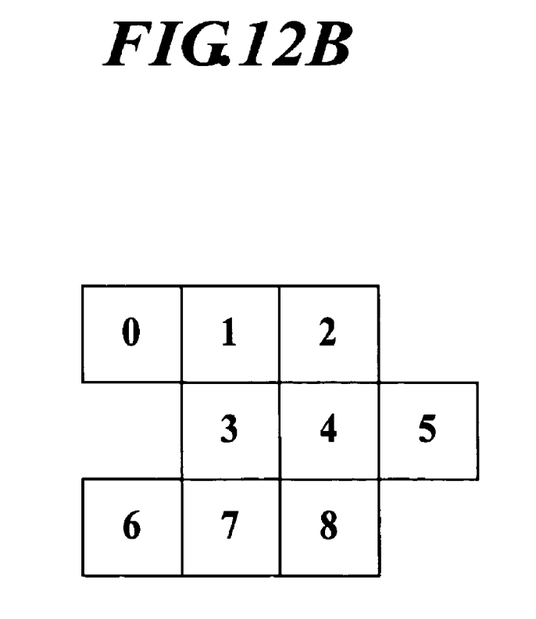

For example, although a screen cell of the shape of a rectangle composed of 8×1 elements has been described, any shapes may be applied as long as the shapes severally include an end which is parallel to the shift direction and the shapes satisfy a complementary relation when the screen cells are made to adjoin to each other in a shift direction. For example, the screen cells of the shapes of a square and ones illustrated in FIGS. 12A and 12B can be applied.

When a screen of a wave line shape is superposed on an input image having a plurality of colors with a screen angle being different, moiré is easily produced compared with the screen shape of a straight line because the number of lines and the angle of the screen of the wave line shape continuously vary. In order to prevent the generation of the moiré, other processing method may be combined, for example, by applying error diffusion processing to a color difficult to be sighted such as yellow (Y) or the like. Thereby, at least the interference owing to the Y color is settled.

The description described above has described the shift method of the screen cell in the i direction. However, a shift in the j direction can be performed by the similar shift method by using the screen cell of the shape which rotates the screen cell of FIG. 3 by 90 degrees. In this case, what is necessary is just to replace the character i with j to apply it in the expression (3).

When the number of screen lines is set to 150 lpi or less, it become easy to sight the wave line shape with the naked eyes. Because the image is configured to the wave line shape by sight, it is possible to make it be well known that the forgery prevention measure is taken, which is preferable.

Although the example of performing the image processing according to the present invention when printout is performed has been described in the present embodiment, it is also possible to perform the image processing by software, and to incorporate the software as a program into an information processing apparatus such as a general computer.

According to the present embodiment, it becomes possible to create a printed matter difficult to be forged at a low cost without performing any high-grade forgery preventing measures such as a hologram, an IC chip or the like, and to apply the forgery preventing measure into wide fields. However, the screen processing unit of the present embodiment can be naturally applied to create a matter having a high added value such as a negotiable instrument or the like. In this case, by performing the other forgery preventing measures such as the hologram, the IC chip and the like, a printed matter which is more difficult to forge can be created.

What is claimed is:

1. An image processing apparatus, comprising:
a controller to receive an input image; and
a screen-processing unit to perform multi-valued screen processing for the input image by using a screen cell, the input image being input from the controller, wherein the screen processing unit comprises:
   a first operation unit to calculate a first shift amount of the screen cell;
   a second operation unit to specify an applied position of the screen cell for each pixel in the input image; and
   a third operation unit to calculate an output value by using a threshold value of the screen cell, the applied position of which has been specified, wherein the applied position of the screen cell is shifted in at least one direction of a main scanning direction and a sub scanning direction of the input image, and wherein the first shift amount is changed periodically according to the applied position of the screen cell.

2. The image processing apparatus of claim 1, wherein the screen processing unit shifts the screen cell by a total shift amount acquired by adding a second shift amount defined according to a screen angle to the periodically changing first shift amount, when the screen angle is provided.

3. The image processing apparatus of claim 1, further comprising:
a tone correction unit which performs a tone correction to the input image according to a variation of a screen pattern shape caused by the shifting of the screen cell, wherein the screen processing unit performs the screen processing to the input image which has been subjected to the tone correction.

4. The image processing apparatus according to claim 1, wherein a screen pattern shape acquired by the screen processing is a shape of a wave line.

5. An image processing method, comprising the steps of:
receiving an input image with a controller; and
performing multi-valued screen processing for the input image with a screen processing unit by using a screen cell, the input image being input from the controller, wherein
multi-valued screen processing further comprises:
calculating a first shift amount of the screen cell;
specifying an applied position of the screen cell for each pixel in the input image:
calculating an output value by using a threshold value of the screen cell, the applied position of which has been specified;
shifting an applied position of the screen cell in at least one direction of a main scanning direction and a sub scanning direction of the input image; and
changing the first shift amount periodically according to the applied position of the screen cell.

6. The image processing method of claim 5,
wherein shifting an applied position of the screen cell further comprises shifting the screen cell by a total shift amount acquired by adding a second shift amount defined according to a screen angle to the periodically changing first shift amount, when the screen angle is provided.

7. The image processing method according to claim 5, further comprising:
performing a tone correction to the input image according to a variation of a screen pattern shape caused by the shifting of the screen cell, wherein the screen processing is performed to the input image which has been subjected to the tone correction.

8. A computer readable recording medium storing a program, the program making a computer function as:
screen processing unit to perform multi-valued screen processing for the input image by using a screen cell, the input image being input from the controller, wherein the screen processing unit comprises:
a first operation unit to calculate a first shift amount of the screen cell;
a second operation unit to specify an applied position of the screen cell for each pixel in the input image; and
a third operation unit to calculate an output value by using a threshold value of the screen cell, the applied position of which has been specified, wherein
the applied position of the screen cell is shifted in at least one direction of a main scanning direction and a sub scanning direction of the input image, and wherein the first shift amount is changed periodically according to the applied position of the screen cell.

9. The computer readable recording medium of claim 8, wherein the computer functioning as the screen processing unit shifts the screen cell by a total shift amount acquired by adding a second shift amount defined according to a screen angle to the periodically changing first shift amount, when the screen angle is provided.

10. The computer readable recording medium of claim 8, further making the computer function as:
a tone correction unit which performs a tone correction to the input image according to a variation of a screen pattern shape caused by the shifting of the screen cell, wherein the computer functioning as the screen processing unit performs the screen processing to the input image which has been subjected to the tone correction.

11. An image processing apparatus, comprising:
a screen processing unit which repeatedly applies a screen cell to an input image in two dimensions, so as to perform screen processing to the input image,
wherein the screen processing unit establishes a state in which relative positions of the repeatedly applied screen cell are shifted by a shift amount which changes periodically in a predetermined direction of the input image.

12. The image processing apparatus of claim 11, further comprising:
a tone correction unit which performs a tone correction to the input image according to a variation of a screen pattern shape caused by the shifting of the screen cell, wherein the screen processing unit performs the screen processing to the input image which has been subjected to the tone correction.

13. An image processing apparatus, comprising the steps of:
when the screen cell is repeatedly applied to an input image in two dimensions so as to perform screen processing to the input image, shifting a screen cell to be a state in which relative positions of the repeatedly applied screen cell are shifted by a shift amount which changes periodically in a predetermined direction of the input image.

14. The image processing apparatus of claim 13, further comprising the step of:
performing a tone correction to the input image according to a variation of a screen pattern shape caused by the shifting of the screen cell, wherein the screen processing is performed to the input image which has been subjected to the tone correction.

15. A computer readable recording medium storing a program, the program making a computer function as:
a screen processing unit which repeatedly applies a screen cell to an input image in two dimensions, so as to perform screen processing to the input image,
wherein the screen processing unit establishes a state in which relative positions of the repeatedly applied screen cell are shifted by a shift amount which changes periodically in a predetermined direction of the input image.

16. The computer readable recording medium of claim 15, wherein the program further makes the computer function as:
a tone correction unit which performs a tone correction to the input image according to a variation of a screen pattern shape caused by the shifting of the screen cell, wherein the computer functioning as the screen processing unit performs the screen processing to the input image which has been subjected to the tone correction.

* * * * *